(12) United States Patent
Liu et al.

(10) Patent No.: US 10,390,275 B2
(45) Date of Patent: Aug. 20, 2019

(54) HANDOVER METHOD, APPARATUS, AND SYSTEM INVOLVING A MOBILE EDGE COMPUTING (MEC) ENTITY

(71) Applicants: HON HAI PRECISION INDUSTRY CO., LTD., New Taipei (TW); NATIONAL TAIWAN UNIVERSITY, Taipei (TW)

(72) Inventors: Jiun-Hao Liu, New Taipei (TW); Ping-Jung Hsieh, Taipei (TW); Hung-Yu Wei, Taipei (TW)

(73) Assignees: HON HAI PRECISION INDUSTRY CO., LTD., New Taipei (TW); NATIONAL TAIWAN UNIVERSITY, Taipei (TW)

( * ) Notice: Subject to any disclaimer, the term of this patent is extended or adjusted under 35 U.S.C. 154(b) by 0 days.

(21) Appl. No.: 16/034,312

(22) Filed: Jul. 12, 2018

(65) Prior Publication Data
US 2019/0021033 A1  Jan. 17, 2019

Related U.S. Application Data

(60) Provisional application No. 62/531,980, filed on Jul. 13, 2017.

(51) Int. Cl.
*H04W 4/00* (2018.01)
*H04W 36/08* (2009.01)
*H04W 36/24* (2009.01)
*H04W 88/14* (2009.01)

(52) U.S. Cl.
CPC ............ *H04W 36/08* (2013.01); *H04W 36/24* (2013.01); *H04W 88/14* (2013.01)

(58) Field of Classification Search
CPC ..................................................... H04W 36/08
See application file for complete search history.

(56) References Cited

U.S. PATENT DOCUMENTS

| 2017/0064591 | A1 | 3/2017 | Padfield et al. |
| 2018/0242204 | A1* | 8/2018 | Zhu ................ H04W 36/0033 |
| 2018/0249317 | A1* | 8/2018 | Kurasugi ................ H04M 1/00 |

OTHER PUBLICATIONS

ETSI, Mobile Edge Computing (MEC);Radio Network Information API, ETSI GS MEC 012 V1.1.1, Jul. 2017, Table 6.3.6-1. 7.8.3.1-1, Chapter 5.2.2.

* cited by examiner

*Primary Examiner* — Amancio Gonzalez
(74) *Attorney, Agent, or Firm* — ScienBiziP, P.C.

(57) ABSTRACT

A handover method is disclosed. The handover method includes receiving, by a first base station, MEC information from a MEC entity, performing, by the first base station, a handover decision based on the MEC information, and transmitting, by the first base station, a handover request to a second base station in response to the handover decision.

26 Claims, 9 Drawing Sheets

HANDOVER METHOD, APPARATUS, AND SYSTEM INVOLVING A MOBILE EDGE COMPUTING (MEC) ENTITY

CROSS-REFERENCE TO RELATED APPLICATIONS

The present application claims the benefit of and priority to a provisional U.S. Patent Application Ser. No. 62/531,980 filed Jul. 13, 2017, entitled "MEC-involved Handover Message Flow Design,"(hereinafter referred to as "US71586 application"). The disclosure of the US71586 application is hereby incorporated fully by reference into the present application.

TECHNICAL FIELD

The present disclosure relates to wireless communication technology, and particularly to handover methods and related devices in a wireless communication system.

BACKGROUND

Handover is a key function in a wireless communication system. It ensures the reliability and stability of mobile communication. For example, when a user equipment (UE) is leaving the a coverage of the serving base station, a handover procedure may be initiated to switch connection from the original serving base station to another base station.

However, in the next generation (e.g., 5G) wireless communication system, a base station may be associated with a Mobile Edge Computing (MEC) entity that offers MEC services to the user, where the MEC entity diversifies the mobility scenarios. For example, two base stations involved in a handover procedure may be related to the same or different MEC entities. Therefore, there is a need in the art for an improved handover mechanism, such that the service connectivity can be maintained during the handover.

SUMMARY

The present disclosure is directed to handover methods and related devices.

According to an aspect of the present disclosure, a method is provided. The method includes receiving, by a first base station, MEC information from a MEC entity, performing, by the first base station, a handover decision based on the MEC information, and transmitting, by the first base station, a handover request to a second base station in response to handover decision.

According to another aspect of the present disclosure, a method is provided. The method includes receiving, by a second base station, a handover request including a MEC requirement from a first base station, and transmitting, by the second base station, a handover response to the first base station in response to the MEC requirement.

According to another aspect of the present disclosure, a method is provided. The method includes providing, by a Mobile Edge (ME) controller, MEC information to a first base station, enabling, by the ME controller, a migration of user data from a first ME host to a second ME host in response to a data forwarding indication from the first base station, and allocating, by the ME controller, a computation resource to a second ME host in response to a MEC resource allocation request from a second base station.

According to another aspect of the present disclosure, a base station is provided. The base station includes one or more non-transitory computer-readable media having computer-executable instructions embodied thereon and at least one processor coupled to the one or more non-transitory computer-readable media. The at least one processor is configured to execute the computer-executable instructions to receive MEC information from a MEC entity, perform a handover decision in response to the MEC information, and transmit a handover request to another base station in response to the handover decision.

According to another aspect of the present disclosure, a base station is provided. The base station includes one or more non-transitory computer-readable media having computer-executable instructions embodied thereon and at least one processor coupled to the one or more non-transitory computer-readable media. The at least one processor is configured to execute the computer-executable instructions to receive a handover request including a MEC requirement from another base station, and transmit a handover response to the another base station in response to the MEC requirement.

According to another aspect of the present disclosure, a MEC entity is provided. The MEC entity includes a first ME host, a second ME host and a ME controller managing the first ME host and the second ME host. The ME controller is configured to provide MEC information to a first base station, enable a migration of user data from the first ME host to the second ME host in response to a data forwarding indication from the first base station, and allocate a computation resource to the second ME host in response to a MEC resource allocation request from a second base station.

BRIEF DESCRIPTION OF THE DRAWINGS

Aspects of the exemplary disclosure are best understood from the following detailed description when read with the accompanying figures. Various features are not drawn to scale, dimensions of various features may be arbitrarily increased or reduced for clarity of discussion.

DETAILED DESCRIPTION

Figure 1:
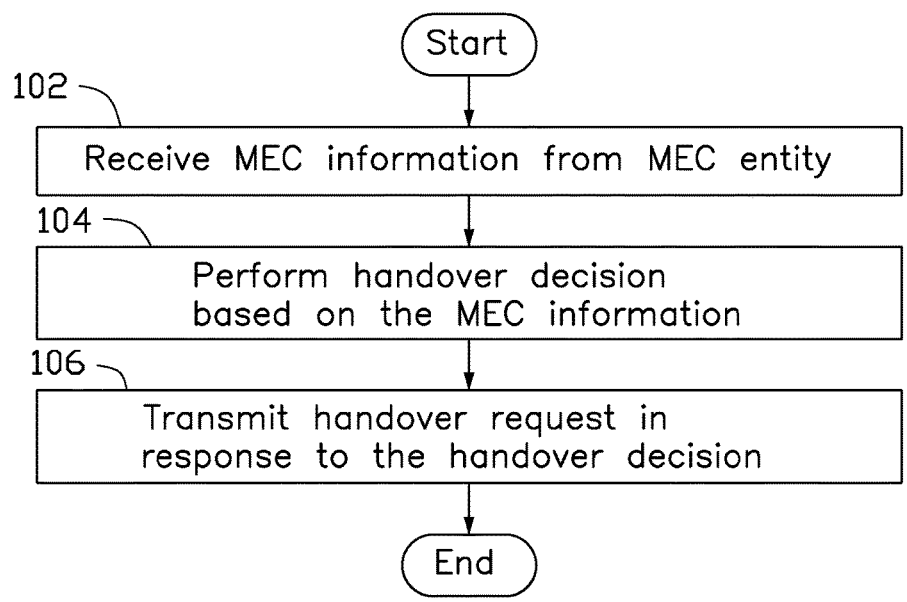
FIG. 1 shows a flowchart of a handover method, in accordance with an example implementation of the present disclosure.

The following description contains specific information pertaining to example implementations in the present disclosure. The drawings in the present disclosure and their accompanying detailed description are directed to merely example implementations. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

For the purpose of consistency and ease of understanding, like features are identified (although, in some examples, not shown) by numerals in the example figures. However, the features in different implementations may be differed in other respects, and thus shall not be narrowly confined to what is shown in the figures.

References to "one implementation," "an implementation," "example implementation," "various implementations," "some implementations," "implementations of the present application," etc., may indicate that the implementation(s) of the present application so described may include a particular feature, structure, or characteristic, but not every possible implementation of the present application necessarily includes the particular feature, structure, or characteristic. Further, repeated use of the phrase "in one implementation," or "in an example implementation," "an implementation," do not necessarily refer to the same implementation, although they may. Moreover, any use of phrases like "implementations" in connection with "the present application" are never meant to characterize that all implementations of the present application must include the particular feature, structure, or characteristic, and should instead be understood to mean "at least some implementations of the present application" includes the stated particular feature, structure, or characteristic. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent.

Additionally, for the purposes of explanation and non-limitation, specific details, such as functional entities, techniques, protocols, standard, and the like are set forth for providing an understanding of the described technology. In other examples, detailed description of well-known methods, technologies, system, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules may be software, hardware, firmware, or any combination thereof. The software implementation may comprise computer executable instructions stored on computer readable medium such as memory or other type of storage devices. For example, one or more microprocessors or general purpose computers with communication processing capability may be programmed with corresponding executable instructions and carry out the described network function(s) or algorithm(s). The microprocessors or general purpose computers may be formed of applications specific integrated circuitry (ASIC), programmable logic arrays, and/or using one or more digital signal processor (DSPs). Although some of the example implementations described in this specification are oriented to software installed and executing on computer hardware, nevertheless, alternative example implementations implemented as firmware or as hardware or combination of hardware and software are well within the scope of the present disclosure.

The computer readable medium includes but is not limited to random access memory (RAM), read only memory (ROM), erasable programmable read-only memory (EPROM), electrically erasable programmable read-only memory (EEPROM), flash memory, compact disc read-only memory (CD ROM), magnetic cassettes, magnetic tape, magnetic disk storage, or any other equivalent medium capable of storing computer-readable instructions.

A radio communication network architecture (e.g., a long term evolution (LTE) system, a LTE-Advanced (LTE-A) system, or a LTE-Advanced Pro system) typically includes at least one base station, at least one UE, and one or more optional network elements that provide connection towards a network. The UE communicates with the network (e.g., a core network (CN), an evolved packet core (EPC) network, an Evolved Universal Terrestrial Radio Access network (E-UTRAN), a Next-Generation Core (NGC), or an internet), through a radio access network (RAN) established by the base station.

It should be noted that, in the present application, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, or a personal digital assistant (PDA) with wireless communication capability. The UE is configured to receive and transmit signals over an air interface to one or more cells in a radio access network.

A base station may include, but is not limited to, a node B (NB) as in the UMTS, an evolved node B (eNB) as in the LTE-A, a radio network controller (RNC) as in the UMTS, a base station controller (BSC) as in the GSM/GERAN, an NG-eNB as in an E-UTRA base station in connection with the 5GC, a next generation node B (gNB) as in the 5G-AN, and any other apparatus capable of controlling radio communication and managing radio resources within a cell. The base station may connect to serve the one or more UEs through a radio interface to the network.

A base station may be configured to provide communication services according to at least one of the following radio access technologies (RATs): Worldwide Interoperability for Microwave Access (WiMAX), Global System for Mobile communications (GSM, often referred to as 2G), GSM EDGE radio access Network (GERAN), General Packet Radio Service (GRPS), Universal Mobile Telecommunication System (UMTS, often referred to as 3G) based on basic wideband-code division multiple access (W-CDMA), high-speed packet access (HSPA), LTE, LTE-A, eLTE (evolved LTE), New Radio (NR, often referred to as 5G), and/or LTE-A Pro. However, the scope of the present application should not be limited to the above mentioned protocols.

The base station is operable to provide radio coverage to a specific geographical area using a plurality of cells forming the radio access network. The base station supports the operations of the cells. Each cell is operable to provide services to at least one UE within its radio coverage. More specifically, each cell (often referred to as a serving cell) provides services to serve one or more UEs within its radio coverage, (e.g., each cell schedules the downlink and optionally uplink resources to at least one UE within its radio coverage for downlink and optionally uplink packet transmissions). The base station can communicate with one or more UEs in the radio communication system through the plurality of cells. A cell may allocate sidelink (SL) resources for supporting proximity service (ProSe). Each cell may have overlapped coverage areas with other cells.

As discussed above, the frame structure for NR is to support flexible configurations for accommodating various next generation (e.g., 5G) communication requirements, such as enhanced mobile broadband (eMBB), massive machine type communication (mMTC), ultra-reliable communication and low latency communication (URLLC), while fulfilling high reliability, high data rate and low latency requirements. The orthogonal frequency-division multiplexing (OFDM) technology as agreed in 3GPP may serve as a baseline for NR waveform. The scalable OFDM numerology, such as the adaptive sub-carrier spacing, the channel bandwidth, and the Cyclic Prefix (CP), may also be used. Additionally, two coding schemes are considered for NR: (1) low-density parity-check (LDPC) code and (2) Polar Code. The coding scheme adaption may be configured based on the channel conditions and/or the service applications.

Moreover, it is also considered that in a transmission time interval TX of a single NR frame, a downlink (DL) transmission data, a guard period, and an uplink (UL) transmission data should at least be included, where the respective portions of the DL transmission data, the guard period, the UL transmission data should also be configurable, for example, based on the network dynamics of NR. In addition, sidelink resource may also be provided in an NR frame to support ProSe services.

FIG. 1 shows a flowchart of a handover method, in accordance with an example implementation of the present disclosure. One of ordinary skill in the art may understand that the illustrated order of actions is illustrative only and the order of the actions may change in response to the present disclosure. Additional actions can be added or fewer actions may be utilized, without departing from this disclosure.

In action 102, a first base station may receive MEC information from a MEC entity. In one implementation, the MEC entity may have a hierarchical structure which includes at least one Mobile Edge (ME) controller (e.g., a ME orchestrator or a ME manager) and at least one ME host. The ME controller may manage the ME host, and oversee/control the overall operation of the MEC entity. Different ME controllers may connect with one another to exchange information and perform a centralized computation (e.g., local balancing). The ME host may serve one or more base stations, and contain a MEC platform and a virtualization infrastructure which provides compute, storage, and network resources for one or more MEC applications.

In one implementation, the MEC information may include a MEC resource configuration, such as a system load or a compute/storage/network resource status of the ME hosts. The MEC information may further include information about available network slice profiles, such as a network characteristic configuration (e.g., data rate, communication delay and jitter) and an application processing configuration (e.g., slice type identifier (ID) for network slices).

In action 104, the first base station may perform a handover decision based on the MEC information. For example, the handover decision may involve a consideration of available MEC resource and radio resource (e.g., bandwidth).

In action 106, the first base station may transmit a handover request to a second base station in response to the handover decision. The second base station and the first base station may be associated with the same or different ME hosts. If the second base station accepts the handover request from the first base station, a communication connection (e.g., a Radio Resource Control (RRC) connection) may then be switched from the first base station to the second base station. In such case, the first base station is a source base station, and the second base station is a target base station during the handover.

Figure 2:
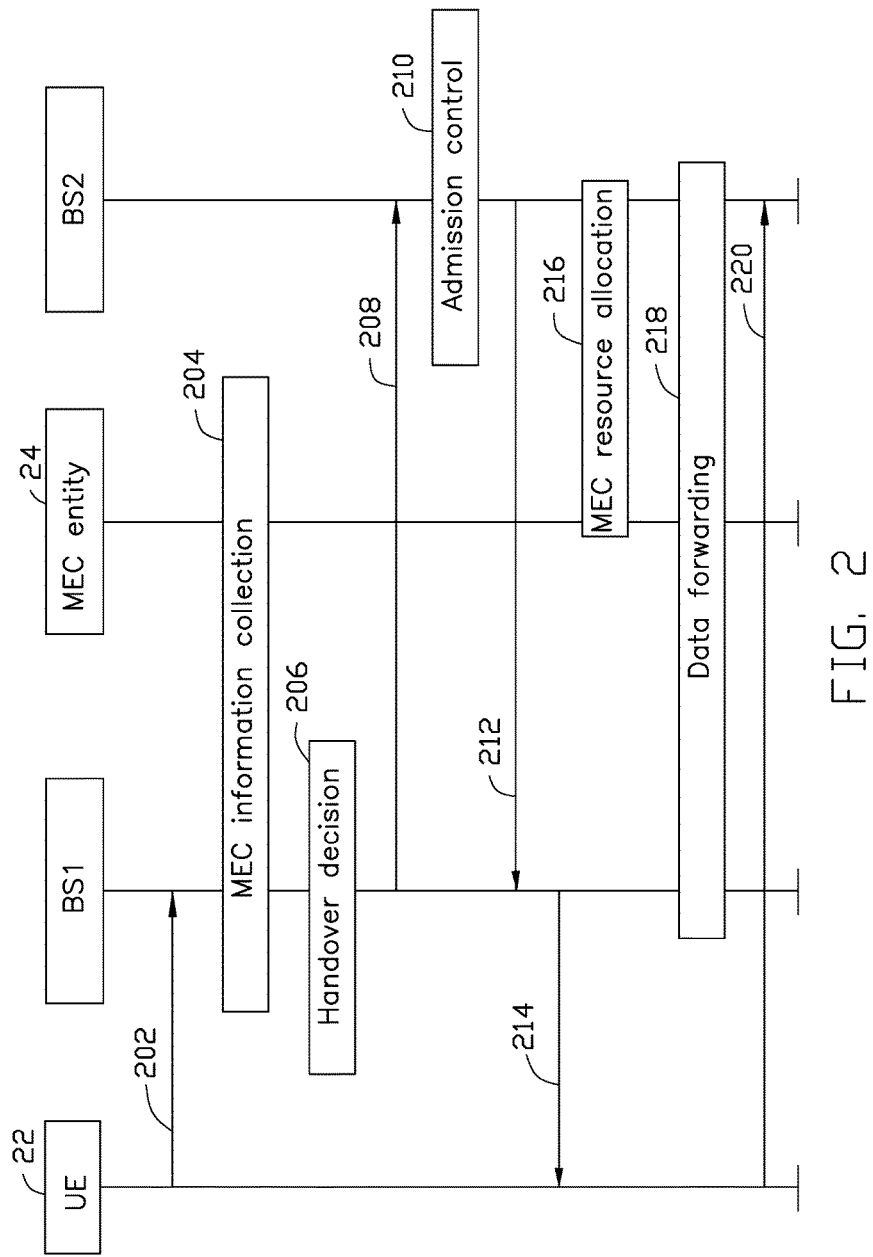
FIG. 2 shows a handover message flow, in accordance with an example implementation of the present disclosure.

FIG. 2 shows a handover message flow, in accordance with an example implementation of the present disclosure. In action 202, the UE 22 transmits a measurement report to the first base station BS1. For example, when a certain event (e.g., the UE 22 detects that the signal strength to the first base station BS1 falls below a threshold) occurs, the UE 22 may be trigged to send the measurement report to the first base station BS1. In another example, the UE 22 may perform measurements as configured by the serving base station (e.g., the first base station BS1), and send the measurement report in one or more preconfigured time slots.

In action 204, the first base station BS1 may collect MEC information from the MEC entity 24. The MEC information may indicate, for example, the capability and/or status of the ME host associated with the neighbor cells (e.g., the second base station BS2).

In action 206, the first base station BS1 may make a handover decision based on the measurement report and the MEC information. For example, the first base station BS1 may select the second base station BS2 as a target base station for the handover based on the MEC information based on a Long Term Evolution (LTE) handover decision principle.

In one implementation, if a UE-requested service has to be processed with MEC (e.g., a MEC-only service or an edge-cloud hybrid computing service), sufficient resources on the target base station (e.g., the second base station BS2) may be guaranteed to support the service during the handover decision procedure. On the other hand, if the requested service is not necessary to be processed with MEC, while there is sufficient MEC resources on the target side, the user may have the choice of whether to request the MEC resource. Details of the handover decision procedure will be discussed with reference to at least FIG. 5.

In action 208, the first base station B S1 may transmit a handover request to the second base station BS2. In the present implementation, the handover request may include a MEC requirement which carries information about the required resource of MEC. For example, the MEC requirement may include at least one of (i) an amount of MEC resources required by the user (e.g., using the UE 22) and (ii) a network slice type. In one implementation, the MEC requirement may further indicate whether the MEC resource is required or not. In one implementation, the MEC requirement may indicate a roughly amount (e.g., high/medium/small) of the required resources through a category or a flavor. In one implementation, the MEC requirement may explicitly indicate the amount of the required resources.

In another implementation, the first base station BS1 may transmit the handover request to a Mobility Management Entity (MME), an Access and Mobility Management Function (AMF) node or a New Generation Node (NGC). For example, in an NR system, the handover request to the AMF node may carry the result of decision about whether to request for the MEC resource.

In action 210, the second base station BS2 may perform an admission control to determine whether to accept the handover request. Details of the admission control procedure will be discussed with reference to at least FIG. 6.

In action 212, the second base station BS2 may transmit a handover response to the first base station BS1 in response to the MEC requirement. For example, the second base station BS2 may transmit a handover response with an ACK to the first base station BS1 if the second base station BS2 is able to meet the MEC requirement. Otherwise, the second base station BS2 may transmit a handover response with a NACK (non-acknowledgement) message to the first base station BS1.

In action 214, the first base station BS1 may transmit an RRC connection reconfiguration message to the UE 22.

In action 216, the second base station BS2 may communicate with the MEC entity 24 to perform a resource allocation procedure. Details of the resource allocation procedure will be discussed with reference to at least FIG. 7.

In action 218, the MEC entity 24 may communicate with the first base station BS1 and the second base station BS2, and initiate a data forwarding procedure that migrates user data from a ME host (e.g., a source ME host associated with the first base station BS1) to another ME host (e.g., a target ME host associated with the second base station BS2). Details of the data forwarding procedure will be discussed with reference to at least FIG. 8.

In action 220, the UE 22 may send an RRC connection reconfiguration complete message to the second base station BS2, so that the RRC connection is switched to the second base station BS2.

Figure 3:
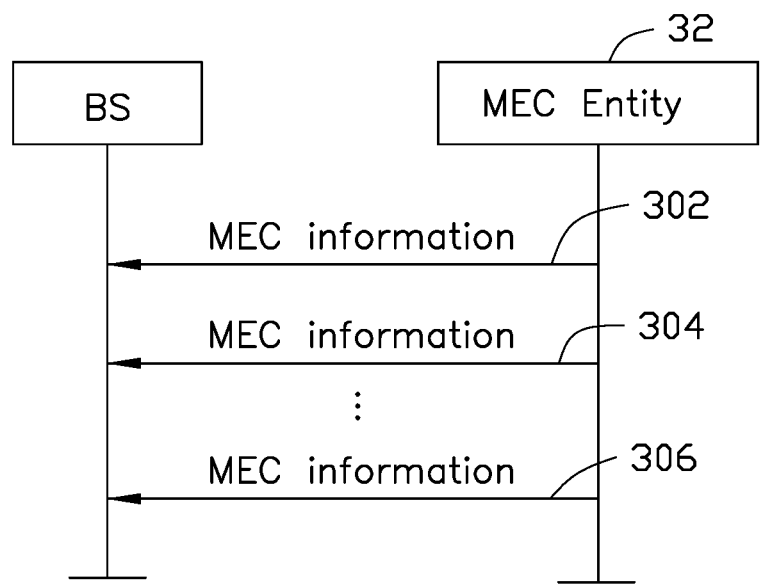
FIG. 3. shows a transmission procedure between the base station and the MEC entity, in accordance with an example implementation of the present disclosure.

FIG. 3. shows a transmission procedure between the base station BS and the MEC entity 32, in accordance with an example implementation of the present disclosure. The base station BS may substantially correspond to the first base station BS1 or the second base station BS2 as shown and described with reference to FIG. 2. The MEC entity 32 may correspond to the MEC entity 24 shown in FIG. 2.

In the present implementation, the MEC entity 32 may transmit the MEC information to the base station BS periodically, as shown in actions 302, 304 and 306. The way the base station BS transmitting the MEC information may, for instance, be broadcast, multicast or unicast. The content of each MEC information may be the same or different.

Figure 4:
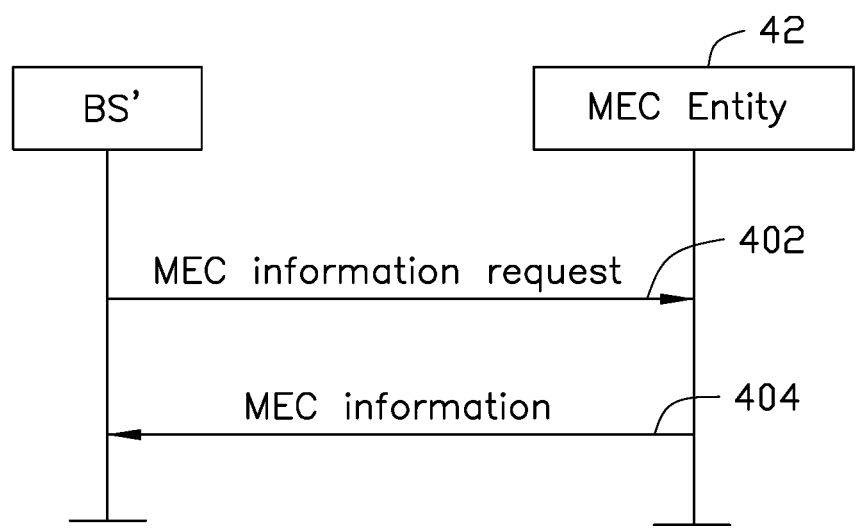
FIG. 4. shows a transmission procedure between the base station and the MEC entity, in accordance with another example implementation of the present disclosure.

FIG. 4. shows a transmission procedure between the base station BS' and the MEC entity 42, in accordance with another example implementation of the present disclosure. The base station BS' may substantially correspond to the first base station BS1 or the second base station BS2 as shown and described with reference to FIG. 2. The MEC entity 42 may correspond to the MEC entity 24 shown in FIG. 2.

In the present implementation, the base station BS' may transmit a MEC information request to the MEC entity 42 to request the MEC information. As shown in FIG. 4, in action 402, the base station BS' may send a MEC information request to the MEC entity 42. For example, when the base station BS' receives a measurement report which meets a condition that may trigger the handover decision, the base station BS' may look up its data base for the MEC information of the ME hosts associated with the neighbor cells. If the MEC information has expired or does not exist, the base station BS' may then send the MEC information request to the MEC entity 42 to request the latest MEC information. In action 404, the MEC entity 42 may reply the base station BS' with the MEC information in response to the MEC information request.

Figure 5:
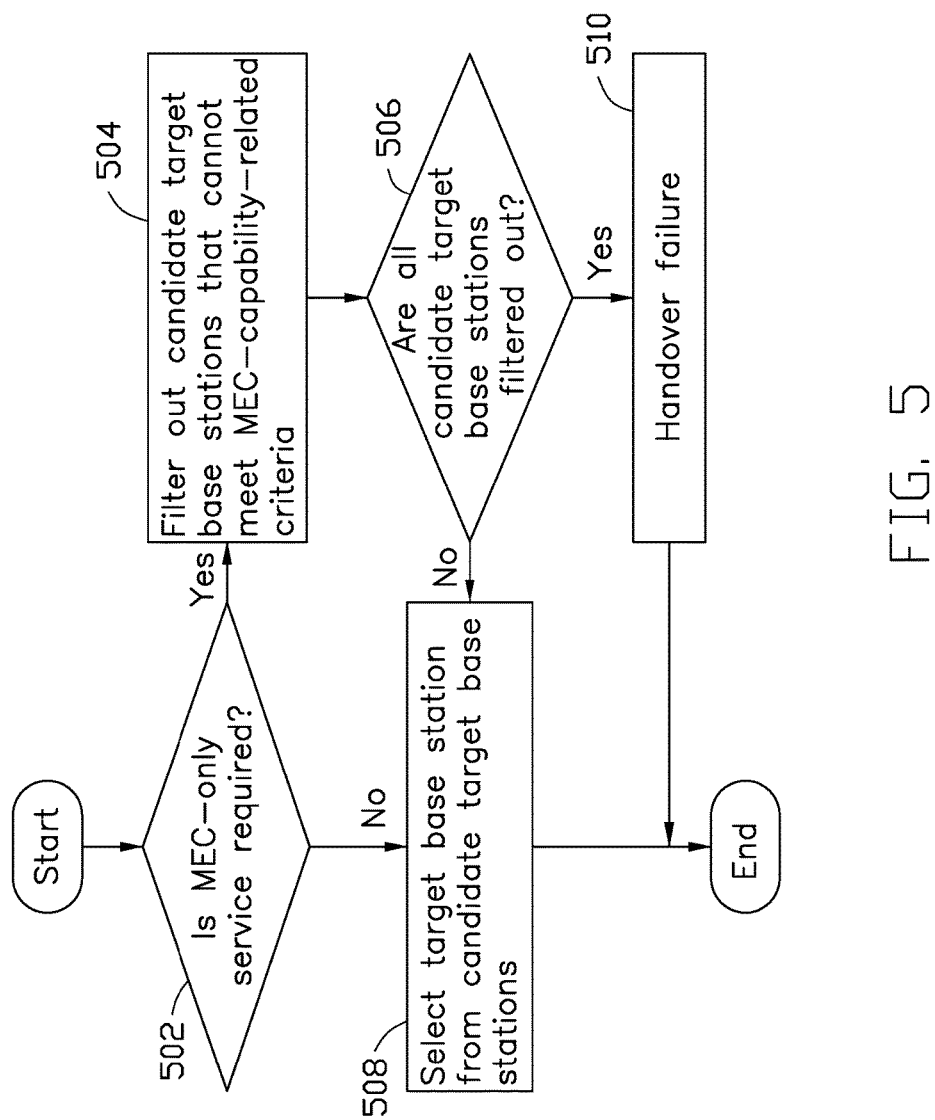
FIG. 5. shows a flowchart of a handover decision procedure, in accordance with an example implementation of the present disclosure.

FIG. 5. shows a flowchart of a handover decision procedure, in accordance with an example implementation of the present disclosure. For the convenience of illustration, the handover decision procedure is illustrated in reference with FIG. 2.

In one implementation, the handover decision procedure may be triggered by the measurement report from the user (e.g., using the UE 22). For example, the first base station BS1 may initiate the handover decision procedure if the measurement report received from the UE 22 meets a triggering condition, such as the signal quality to the serving cell falling below a threshold.

The first base station BS1 may select the target base station for the handover in the handover decision procedure. For example, in the present implementation, the first base station BS1 may select the second base station BS2 as the target base station for the handover based on the MEC information.

As shown in FIG. 5, in action 502, the first base station BS1 may determine whether the UE 22 requires a MEC-only service (or an edge-cloud hybrid service) or not. If yes, in action 504, the first base station B S1 may filter out candidate target base stations that cannot meet the MEC-capability-related criteria. For example, the first base station BS1 may remove a candidate target base station that runs out of its MEC resources from a list of candidate base stations. On the contrary, if the determination in action 502 is no, the procedure may proceed to action 508.

In one implementation, a candidate target base station may release essential resources (e.g., by directing other users' service to the cloud) to support the MEC requirement, even if the candidate target base station originally does not have sufficient MEC resources to support the required MEC-only service. In such case, the candidate target base station may not be filtered out from the list.

In action 506, the first base station BS1 may determine whether all candidate target base stations are filtered out. If no, in action 508, the first base station BS1 may select the target base station (e.g., the second base station BS2) from the candidate target base stations based on the signal quality or other LTE handover decision principles. For example, the first base station BS1 may select the candidate target base station with the best Signal to Interference plus Noise Ratio (SINR) to the UE 22 as the target base station. If the outcome of determination from action 506 is yes (e.g., all candidate target base stations are filtered out), then the handover fails in action 510.

In brief, in the present implementation, the first base station BS1 may perform a two-stage filtering process to select the target base station from the candidate target base stations. One stage is performed based on the MEC-capability-related criteria. The other stage is performed based on the signal quality (or other LTE handover decision principles). One of ordinary skill in the art may understand that the order of the two stages can change in response to the present disclosure. For example, in one implementation, the first base station BS1 may first filter out candidate target base stations with poor signal quality, and then select the target base station from the remaining candidate target base stations based on the MEC-capability-related criteria.

Figure 6:
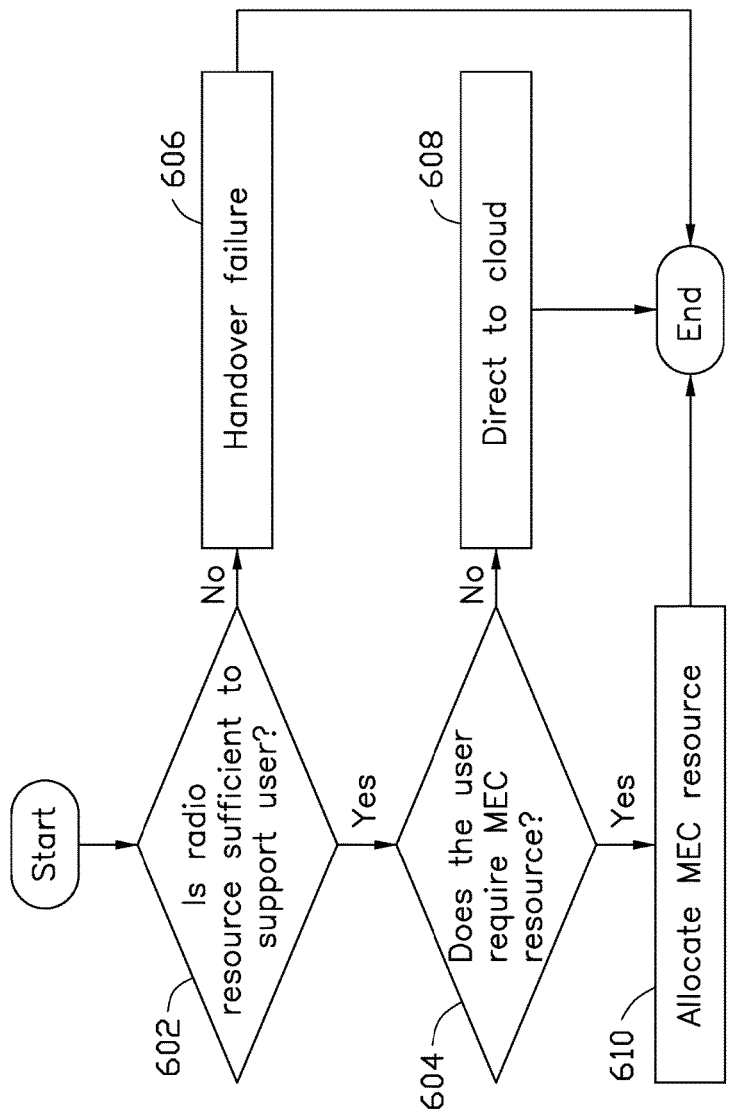
FIG. 6 shows a flowchart of an admission control procedure, in accordance with an example implementation of the present disclosure.

FIG. 6 shows a flowchart of an admission control procedure during a handover, in accordance with an example implementation of the present disclosure. For the convenience of illustration, the admission control procedure is illustrated in reference with FIG. 2.

During the admission control procedure, the second base station BS2 may check its resource state and the user's requirement to determine whether to accept the handover request.

As shown in FIG. 6, in action 602, the second base station BS2 may check whether the radio resource is sufficient to support the user (e.g., the UE 22). If yes, the procedure proceeds to action 604. If no, the handover fails in action 606.

In action 604, the second base station BS2 may determine whether the user requires the MEC resource or not, based on the MEC requirement in the handover request. If yes, the procedure may continue to action 610, in which the MEC resource allocation procedure is initiated. If no, the second base station BS2 may accept the handover request, and direct the user's service to the cloud, as shown in action 608.

Figure 7:
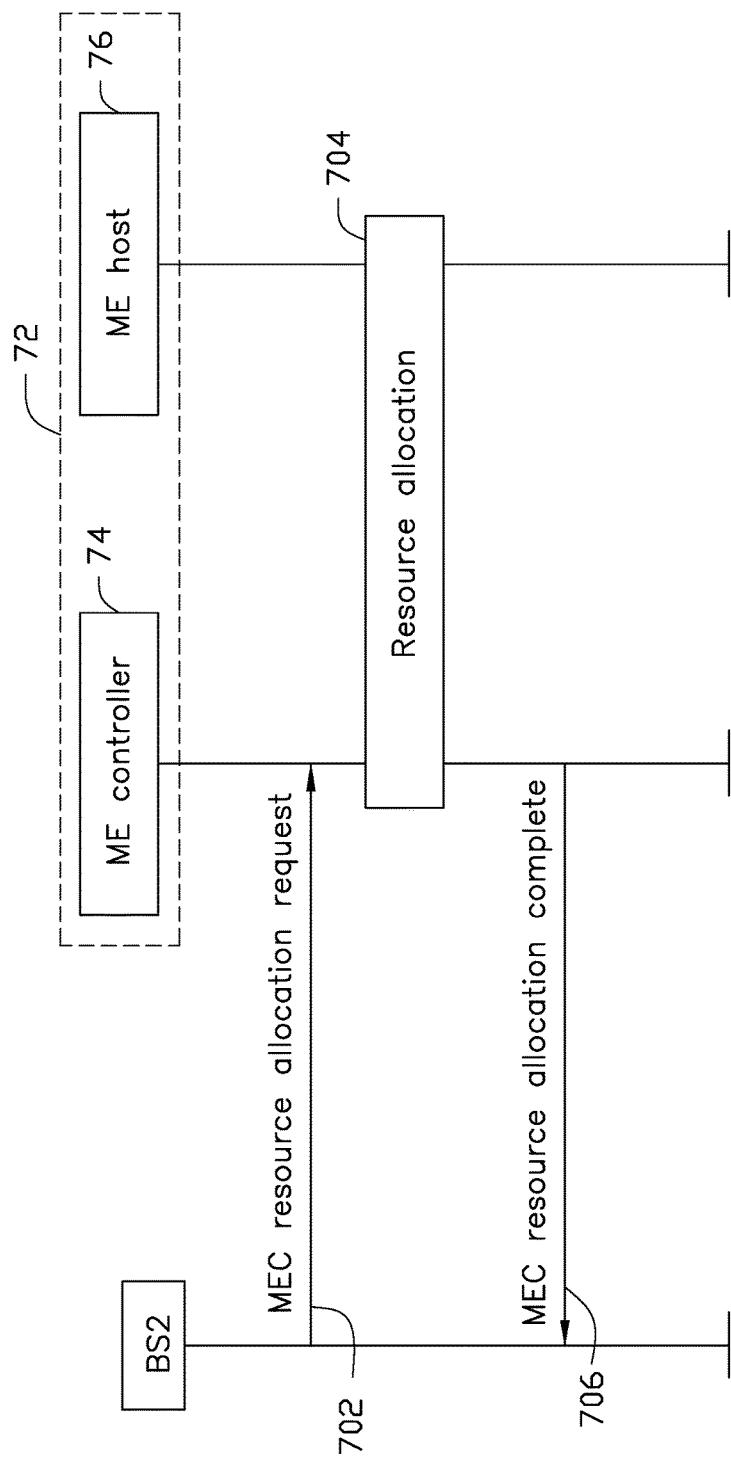
FIG. 7. shows a resource allocation procedure, in accordance with an example implementation of the present disclosure.

FIG. 7 shows a resource allocation procedure during a handover, in accordance with an example implementation of the present disclosure. For the convenience of illustration, the resource allocation procedure is illustrated in reference with FIG. 2.

In the present implementation, the MEC entity 72 may substantially correspond to the MEC entity 24, as shown and described in reference with FIG. 2. The second base station BS2 may be selected as the target base station for the handover.

The MEC entity 72 may include a ME controller 74 and a ME host 76. The ME controller 74 may be a ME orchestrator or a ME manager, configured to perform a system-level or host-level management. The ME host 76 may run one or more MEC applications on a MEC platform to provide the MEC service. In the present implementation, the ME host 76 is associated with the second base station BS2 and provides MEC services correspondingly.

During the resource allocation procedure, MEC entity 72 may communicate with the second base station BS2 and allocate the MEC resource to the ME host 76 associated with the second base station BS2. In one implementation, the resource allocation procedure may launch a Virtual Machine (VM) in OpenStack.

As shown in FIG. 7, in action 702, the second base station BS2 may transmit a MEC resource allocation request to the ME controller 74. In action 704, the ME controller 74 may allocate a computation resource to the ME host 76 in response to the MEC resource allocation request.

In one implementation, the MEC resource allocation request may indicate the required MEC computational resource, storage, etc. For example, the MEC resource allocation request may include at least one of a UE ID, a network slice type and a service ID, where the service ID may be an application ID, an IP address or a port number.

In one implementation, the MEC entity 72 may use the service ID to determine whether the same service has been running on the target ME host (e.g., the ME host 76). For example, if a first user is running a video streaming application when the handover occurs and a second user is also running the same video on the target ME host, the ME controller 74 just needs to register the first user to the target ME host, so that the first user may share the MEC resource on the target ME host. On the other hand, if a user is running a video streaming application when the handover occurs while there are no other users running the same video on the target ME host, the ME controller 74 may fetch the resource of the video from a remote server by an application ID provided by the user.

In another implementation, the MEC entity 72 may use the service ID to determine where to fetch the service, if the service is not on the target ME host.

In action 706, the MEC entity 72 may transmit a MEC resource allocation complete message to the second base station BS2. In one implementation, the MEC resource allocation complete message may contain information for the upcoming user (e.g., the UE 22) to access the allocated resources (e.g., the IP address of a virtual resource (e.g., a VM), and/or the port number). In another implementation, the MEC resource allocation complete message may be an indication of whether the MEC resource allocation request is accepted.

Figure 8:
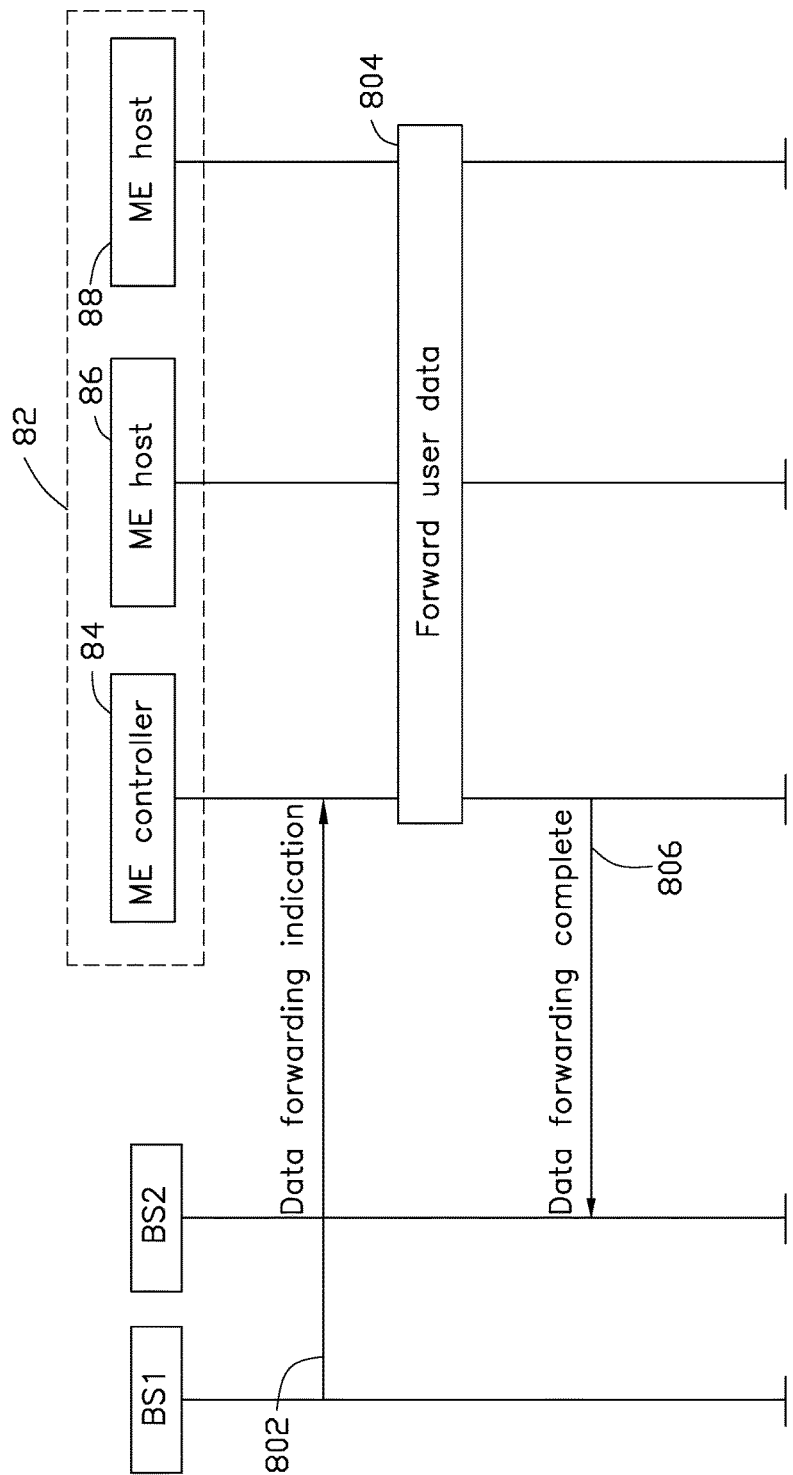
FIG. 8. shows a data forwarding procedure, in accordance with an example implementation of the present disclosure.

FIG. 8. shows a data forwarding procedure during a handover, in accordance with an example implementation of the present disclosure. For the convenience of illustration, the data forwarding procedure is illustrated in reference with FIG. 2.

In the present implementation, the MEC entity 82 may substantially correspond to the MEC entity 24, as shown and described in reference with FIG. 2. The first base station BS1 and the second base station BS2 may be the source base station and the target base station for the handover, respectively.

The MEC entity 82 may include a ME controller 84, a first ME host 86 and a second ME host 88. During the data forwarding procedure, the MEC entity 82 may communicate with the first base station BS1 and the second base station BS2, and forward the user data from the source ME host (e.g., the first ME host 86) associated with the first base station BS1 to the target ME host (e.g., the second ME host 88) associated with the second base station BS2.

As shown in FIG. 8, in action 802, the first base station BS1 may transmit a data forwarding indication to the MEC entity 82. The data forwarding indication may include, for example, at least one of a UE ID, a user profile and a ME host ID (e.g., the ID of the second ME host 88).

In action 804, the ME controller 84 may enable a migration of user data from the first ME host 86 to the second ME host 88 in response to the data forwarding indication. For example, if a user is running a video streaming application when the handover occurs, the user's current playing time and coding rate may be forwarded to the target ME host (e.g., the second ME host 88) as a user profile. In action 806, the ME controller 84 may send a data forwarding complete message to the first base station BS1. In one implementation, the data forwarding indication and the data forwarding complete message may be Layer-Three (L3) messages, and the user data may be migrated between the ME hosts in the form of MEC commands.

Figure 9:
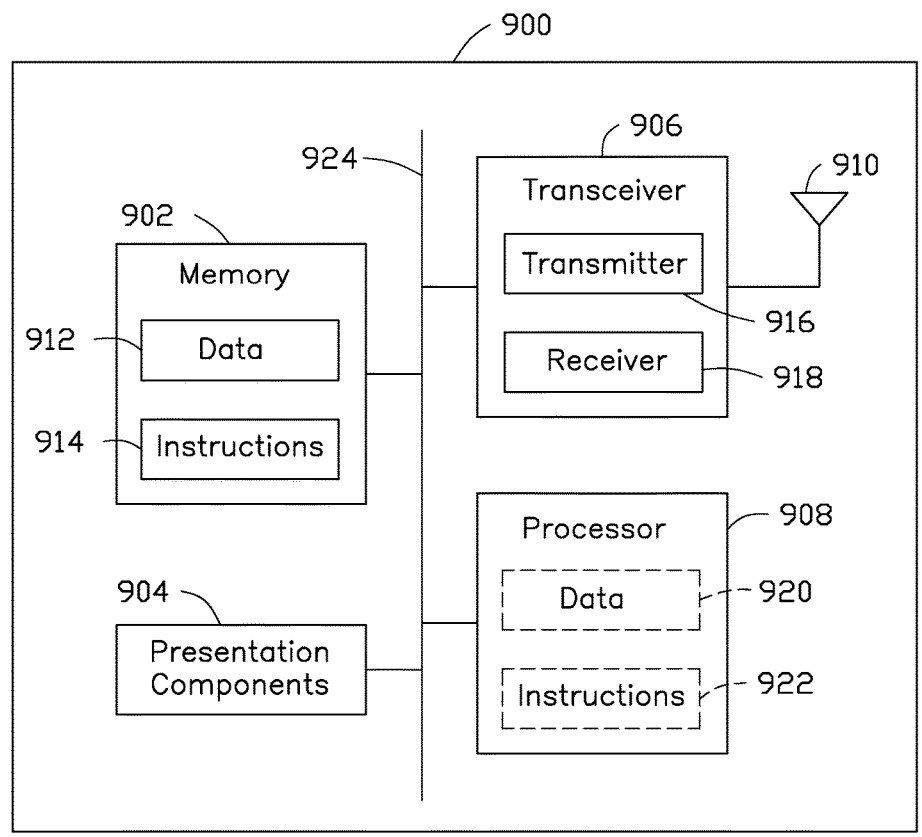
FIG. 9 shows a block diagram of wireless communication apparatus, in accordance with various aspects of the present application.

FIG. 9 shows a block diagram of wireless communication apparatus, in accordance with various aspects of the present application. The wireless communication apparatus may be realized as a base station, a UE, or a MEC entity as described herein.

As shown in FIG. 9, the wireless communication apparatus 900 may include a transceiver 906, a processor 908, a memory 902, one or more presentation components 904, and at least one antenna 910. The wireless communication apparatus 900 may also include an RF spectrum band module, a base station communications module, a network communications module, and a system communications management module, input/output (I/O) ports, I/O components, and power supply (not explicitly shown in FIG. 9). Each of these components may be in communication with each other, directly or indirectly, over one or more buses 924.

The transceiver 906 having a transmitter 916 and a receiver 918 may be configured to transmit and/or receive time and/or frequency resource partitioning information. In some implementations, the transceiver 906 may be configured to transmit in different types of subframes and slots including, but not limited to, usable, non-usable and flexibly usable subframes and slot formats. The transceiver 906 may be configured to receive data and control channels.

The wireless communication apparatus 900 may include a variety of computer-readable media. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal. Communication media typically embodies computer-readable instructions, data structures, program modules or other data in a modulated data signal such as a carrier wave or other transport mechanism and includes any information delivery media.

The memory 902 may include computer-storage media in the form of volatile and/or non-volatile memory. The memory 902 may be removable, non-removable, or a combination thereof. Example memory includes solid-state memory, hard drives, optical-disc drives, and etc. As illustrated in FIG. 9, the memory 902 may store data 912 and computer-readable, computer-executable instructions 914 (e.g., software codes) that are configured to, when executed, cause the processor 908 to perform various functions described herein. Alternatively, the instructions 914 may not be directly executable by the processor 908 but be configured to cause the wireless communication apparatus 900 (e.g., when compiled and executed) to perform various functions described herein.

The processor 908 may include an intelligent hardware device, e.g., a central processing unit (CPU), a microcontroller, an ASIC, etc. The processor 908 may include memory. The processor 908 may process data 920 and instructions 922 received from the memory 902, and information through the transceiver 906, the base band communications module, and/or the network communications module. The processor 908 may also process information to be sent to the transceiver 906 for transmission through the antenna 910.

One or more presentation components 904 presents data indications to a person or other device. Example one or more presentation components 904 include a display device, speaker, printing component, vibrating component, etc.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A method comprising:
    receiving, by a first base station, Mobile Edge Computing (MEC) information from a MEC entity, wherein the MEC information comprises a MEC resource configuration;
    performing, by the first base station, a handover decision based on the MEC information; and
    transmitting, by the first base station, a handover request to a second base station in response to the handover decision.

2. The method according to claim 1, further comprising:
    transmitting, by the first base station, a MEC information request to the MEC entity to request the MEC information.

3. The method according to claim 1, further comprising:
    receiving, by the first base station, the MEC information from the MEC entity periodically.

4. The method according to claim 1, wherein the performing the handover decision further comprises:
    selecting, by the first base station, the second base station in response to the MEC information.

5. The method according to claim 1, wherein the handover request comprises a MEC requirement.

6. The method according to claim 5, wherein the MEC requirement comprises a network slice type.

7. The method according to claim 1, further comprising:
    transmitting, by the first base station, a data forwarding indication to the MEC entity.

8. A method comprising:
    performing, by a first base station, a handover decision based on Mobile Edge Computing (MEC) information;
    receiving, by a second base station, a handover request from the first base station, wherein the handover request includes a MEC requirement; and
    transmitting, by the second base station, a handover response to the first base station in response to the MEC requirement.

9. The method according to claim 8, further comprising:
    determining, by the second base station, whether a MEC resource is required according to the MEC requirement; and
    transmitting, by the second base station, a MEC resource allocation request to a MEC entity when the MEC resource is required.

10. The method according to claim 9, wherein the MEC resource allocation request comprising at least one of a UE identifier (ID), a network slice type and a service ID.

11. The method according to claim 9, further comprising:
    receiving, by the second base station, a MEC resource allocation complete message from the MEC entity.

12. A method comprising:
    providing, by a Mobile Edge (ME) controller, MEC information to a first base station;
    enabling, by the ME controller, a migration of user data from a first ME host to a second ME host in response to a data forwarding indication from the first base station; and
    allocating, by the ME controller, a computation resource to the second ME host in response to a MEC resource allocation request from a second base station.

13. The method according to claim 12, wherein the data forwarding indication comprises at least one of a UE identifier (ID), a user profile and a ME host ID.

14. A base station comprising:
    one or more non-transitory computer-readable media having computer-executable instructions embodied thereon; and
    at least one processor coupled to the one or more non-transitory computer-readable media, and configured to execute the computer-executable instructions to:
    receive Mobile Edge Computing (MEC) information from a MEC entity, wherein the MEC information comprises a MEC resource configuration;
    perform a handover decision in response to the MEC information; and
    transmit a handover request to another base station in response to the handover decision.

15. The base station according to claim 14, wherein the at least one processor is further configured to execute the computer-executable instructions to:
transmit a MEC information request to the MEC entity to request the MEC information.

16. The base station according to claim 14, wherein the at least one processor is further configured to execute the computer-executable instructions to:
receive the MEC information from the MEC entity periodically.

17. The base station according to claim 14, wherein the at least one processor is further configured to execute the computer-executable instructions to:
select the another base station in response to the MEC information.

18. The base station according to claim 14, wherein the handover request comprises a MEC requirement.

19. The base station according to claim 18, wherein the MEC requirement comprises a network slice type.

20. The base station according to claim 14, wherein the at least one processor is further configured to execute the computer-executable instructions to:
transmit a data forwarding indication to the MEC entity.

21. A base station comprising:
one or more non-transitory computer-readable media having computer-executable instructions embodied thereon; and
at least one processor coupled to the one or more non-transitory computer-readable media, and configured to execute the computer-executable instructions to:
receive a handover request from another base station, wherein the handover request includes a Mobile Edge Computing (MEC) requirement and is generated in response to a handover decision based on MEC information; and
transmit a handover response to the another base station in response to the MEC requirement.

22. The base station according to claim 21, wherein the at least one processor is further configured to execute the computer-executable instructions to:
determine whether a MEC resource is required according to the MEC requirement; and
transmit a MEC resource allocation request to a MEC entity when the MEC resource is required.

23. The base station according to claim 22, wherein the MEC resource allocation request comprising at least one of a UE identifier (ID), a network slice type and a service ID.

24. The base station according to claim 22, wherein the at least one processor is further configured to execute the computer-executable instructions to:
receive a MEC resource allocation complete message from the MEC entity.

25. A Mobile Edge Computing (MEC) entity comprising:
a first Mobile Edge (ME) host;
a second ME host; and
a ME controller managing the first ME host and the second ME host, configured to provide MEC information to a first base station, enable a migration of user data from the first ME host to the second ME host in response to a data forwarding indication from the first base station, and allocate a computation resource to the second ME host in response to a MEC resource allocation request from a second base station.

26. The MEC entity according to claim 25, wherein the data forwarding indication comprises at least one of a UE identifier (ID), a user profile and a ME host ID.

* * * * *